(12) United States Patent
Bosaglia et al.

(10) Patent No.: US 12,168,293 B2
(45) Date of Patent: Dec. 17, 2024

(54) APPARATUS FOR TRANSFERRING A VIAL FROM A FIRST STATION TO A SECOND STATION

(71) Applicant: Thermo Fisher Scientific S.p.A., Rodano (IT)

(72) Inventors: Tiziano Bosaglia, Rodano (IT); Massimo Gherlinzoni, Rodano (IT); Riccardo Facchetti, Milan (IT); Flavio Antoniucci, Rodano (IT)

(73) Assignee: Thermo Fisher Scientific S.p.A., Rodano (IT)

( * ) Notice: Subject to any disclaimer, the term of this patent is extended or adjusted under 35 U.S.C. 154(b) by 781 days.

(21) Appl. No.: 17/311,248

(22) PCT Filed: Dec. 3, 2019

(86) PCT No.: PCT/IB2019/060396
§ 371 (c)(1),
(2) Date: Jun. 4, 2021

(87) PCT Pub. No.: WO2020/115654
PCT Pub. Date: Jun. 11, 2020

(65) Prior Publication Data
US 2022/0024054 A1   Jan. 27, 2022

(30) Foreign Application Priority Data
Dec. 4, 2018   (IT) .................. 102018000010801

(51) Int. Cl.
*B25J 15/02*   (2006.01)
*B25J 15/06*   (2006.01)
(Continued)

(52) U.S. Cl.
CPC ......... *B25J 15/028* (2013.01); *B25J 15/0608* (2013.01); *B25J 15/086* (2013.01); *B25J 15/10* (2013.01)

(58) Field of Classification Search
CPC ........ B25J 15/028; B25J 15/10; B25J 15/086; B25J 15/08; B25J 15/0608
(Continued)

(56) References Cited

U.S. PATENT DOCUMENTS 8,439,414 B2 *   5/2013   Neeper ................ B25J 15/0028
                                                    294/902
10,836,046 B2 *   11/2020   Brudniok ............... B25J 15/103
(Continued)

FOREIGN PATENT DOCUMENTS

DE   102016220643 A1   4/2018
JP         5250086 B2   4/2013
(Continued)

*Primary Examiner* — Paul T Chin

(57) ABSTRACT

The present invention concerns an apparatus (100) for transferring a vial (200) from a first station (301) to a second station (302), comprising a stock (101) of vials in said first station, a mobile arm (1) provided with at least three gripping elements (2a-2d) movable between one another in a controlled way at least between a first and a second position, wherein the free ends of at least part of said gripping elements (2a-2d) have a magnet (5), and wherein the area of the polygon (P) having as vertexes said free ends in said first position is smaller than the area of the polygon (P) having as vertexes said free ends in said second position.

13 Claims, 16 Drawing Sheets

(51) Int. Cl.
*B25J 15/08* (2006.01)
*B25J 15/10* (2006.01)

(58) Field of Classification Search
USPC ............................... 294/86.4, 106, 192, 203
See application file for complete search history.

(56) References Cited

U.S. PATENT DOCUMENTS

| 11,260,539 | B2* | 3/2022 | Bangalore Srinivas ..................... B25J 15/0038 |
| 2013/0309057 | A1* | 11/2013 | Yasuda ..................... B25J 15/08 294/119.1 |
| 2014/0214202 | A1 | 7/2014 | Nammoto et al. |
| 2015/0151438 | A1* | 6/2015 | Hecht .................... B25J 15/026 294/192 |
| 2015/0251321 | A1 | 9/2015 | Ishikawa |
| 2015/0273468 | A1 | 10/2015 | Croquette et al. |
| 2016/0278872 | A1 | 9/2016 | Gombert et al. |
| 2016/0348773 | A1* | 12/2016 | Sebert .................... B23Q 11/10 |
| 2022/0305675 | A1* | 9/2022 | An .......................... B25J 15/08 |

FOREIGN PATENT DOCUMENTS

| JP | 2017104967 A | 6/2017 |
| WO | 2018073336 A1 | 4/2018 |

\* cited by examiner

APPARATUS FOR TRANSFERRING A VIAL FROM A FIRST STATION TO A SECOND STATION

FIELD OF THE INVENTION

The present invention relates to the field of handling vials, and in particular to the field of transporting vials from a first station, in which they are stored, to a second position, typically inside a device adapted to operate with such vials. The present invention finds particular application in the transfer of a vial for gas chromatography or liquid chromatography, from a storage station to a station for sampling the contents of such vial.

KNOWN PRIOR ART

Known vials are of different sizes. The biggest vials typically have a metal element placed at the upper portion of the vial. Thus, apparatuses for moving such vials, which have a transporting arm provided with a magnetic element having sizes typically comparable to those of the upper portion of the respective vial, are known.

However, it is not common to provide the smallest vials with metal or ferromagnetic elements, due to their reduced sizes. The respective transporting arm thus has mobile gripping elements adapted to grab the vial.

There thus are apparatuses adapted to move the big vials and apparatuses adapted to move the small vials.

Moreover, it is known in the art that a same apparatus has a replaceable end portion, so that to be able to selectively operate with big vials and small vials. Although allowing to operate with both types of vials, such solution requires the replacement of a piece of the apparatus, thus adding complexity and cost to the device.

Object of the present invention is thus to solve the problems of the known art described above.

A particular object of the present invention is to provide an apparatus that can operate with vials of different sizes.

SUMMARY OF THE INVENTION

These and other objects of the present invention are solved by an apparatus according to one or more of the attached claims.

According to an aspect of the invention, an apparatus for transferring a vial from a first station to a second station comprises a mobile arm provided with at least two, preferably at least three, gripping elements, in turn provided with a magnet arranged at least at the free ends of the gripping elements. The gripping elements are movable between one another in a controlled way at least between a first and a second position. The area of the polygon having as vertexes the free ends of the gripping elements in the first position is smaller with respect to the second position. Preferably, each gripping element can be moved with respect to another gripping element. Embodiments wherein only part of the gripping elements are movable with respect to the body to which the gripping elements are constrained are anyhow provided.

The apparatus of the present invention is thus able to operate with different types of vials. The big vials can be raised by coupling the magnets with a corresponding magnetic element of the vial. The small vials can instead be raised by mechanically coupling the gripping elements with the vial, with the firsts tightening around the second.

Preferably, at least part of the gripping elements, even more preferably all, have the same length measured from the same surface of the apparatus.

According to a possible aspect, the gripping elements have substantially rectilinear longitudinal axis, and the axes of the gripping elements are substantially parallel to one another.

According to an aspect of the invention, the first and the second position of the gripping elements are stable positions. Preferably, they are mechanically stable, i.e. the apparatus has mechanical elements, for example selected between gears, springs, shape couplings, etc., which are adapted to hold the gripping elements alternatively in the first and the second position. It is thus necessary to exert a force adapted to overcome the resistance of such mechanical elements in order to move the gripping elements between the first and the second position. Such force is typically provided by an electric motor.

According to an aspect of the present invention, the gripping elements are constrained to a cam adapted to move them. Preferably, an electric motor thus drives the movement of such cam, which in turn causes the movement of the gripping elements. According to a preferred aspect, such cam has a rotatable body provided with slots for the gripping elements. The rotation of the cam causes the movement of the gripping elements inside the respective slots.

A further sensor can be used for checking the presence of a vial in the first station.

Moreover, the apparatus can comprise a sensor for checking the presence of a vial constrained to the gripping elements.

Moreover, the apparatus can comprise a sensor for checking the position of the gripping elements.

According to a further aspect of the invention, it is possible to use a sensor for checking the vial is held vertically.

According to an aspect of the invention, in the second position, the polygon traced with vertexes at the ends of the gripping elements has an area between 100 and 400 mm$^2$, more preferably between 130 and 350 mm$^2$.

According to an aspect of the invention, in the first position, the area of the polygon traced with vertexes at the ends is between 0.2 and 0.7 times the area of the polygon in the second position.

According to a preferred aspect, the polygon is substantially a square, both in the first and in the second position of the gripping elements. The area of the square in the second position is preferably between 170 and 250 mm$^2$.

Preferably, in the first position or in the second position, such polygon has sides of substantially equal length.

An aspect of the present invention further concerns a method for moving a vial between a first station and a second station by means of an apparatus according to one or more of the aspects discussed above, comprising the steps of:

i. Moving the mobile arm next to a vial in the first station;
ii. Arranging the gripping elements so that to collect the vial from the first station;
iii. Moving the vial from the first station to the second station;
iv. Releasing the vial in the second station.

As discussed above, in the step ii, if the vial has dimensions greater than a predetermined value, the gripping elements are magnetically coupled to a corresponding ferromagnetic element of the vial; if the vial has dimensions smaller than a predetermined value, the gripping elements are placed in the first position around the vial, so that to achieve a mechanical coupling between the gripping elements and the vial.

BRIEF DESCRIPTION OF THE FIGURES

With reference to the figures attached, exemplary and non-limiting embodiments of the present invention are now discussed, in which.

DETAILED DESCRIPTION OF SOME EMBODIMENTS OF THE INVENTION

Figure 1:
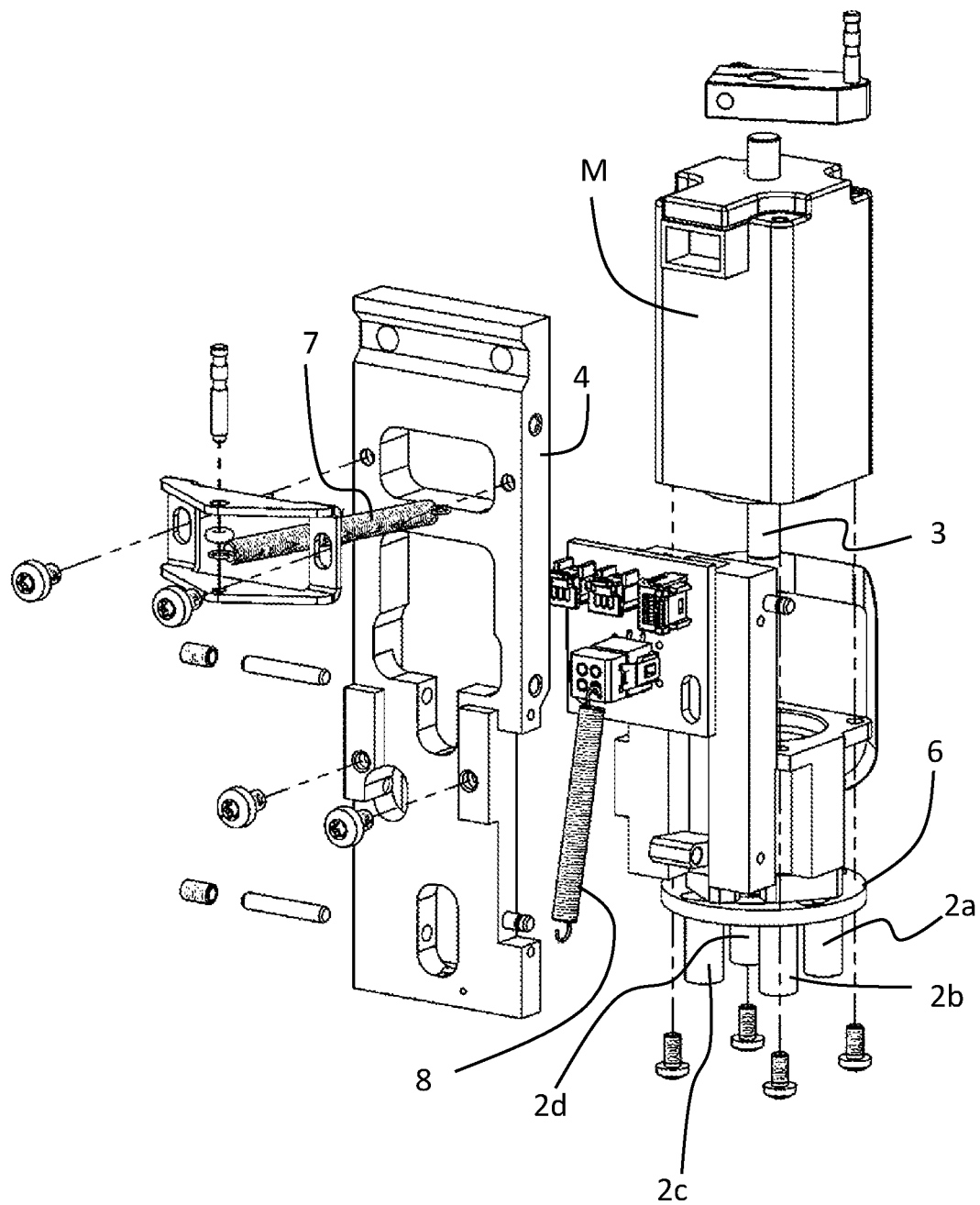
FIG. 1 is an exploded perspective view of a portion of an arm according to a possible embodiment of the present invention.

An apparatus 100 for transferring a vial 200 from a first station 301 to a second station 302 comprises a mobile arm 1 provided with gripping elements 2a, 2b, 2c, 2d. In particular, in the first station 301, the apparatus 100 comprises a stock 101 of vials 200, typically comprising one or more trays 102. The trays 102, or anyhow more generally the stock 101, are provided with a plurality of housings 101a adapted for each accommodating one vial 200.

Figure 7:
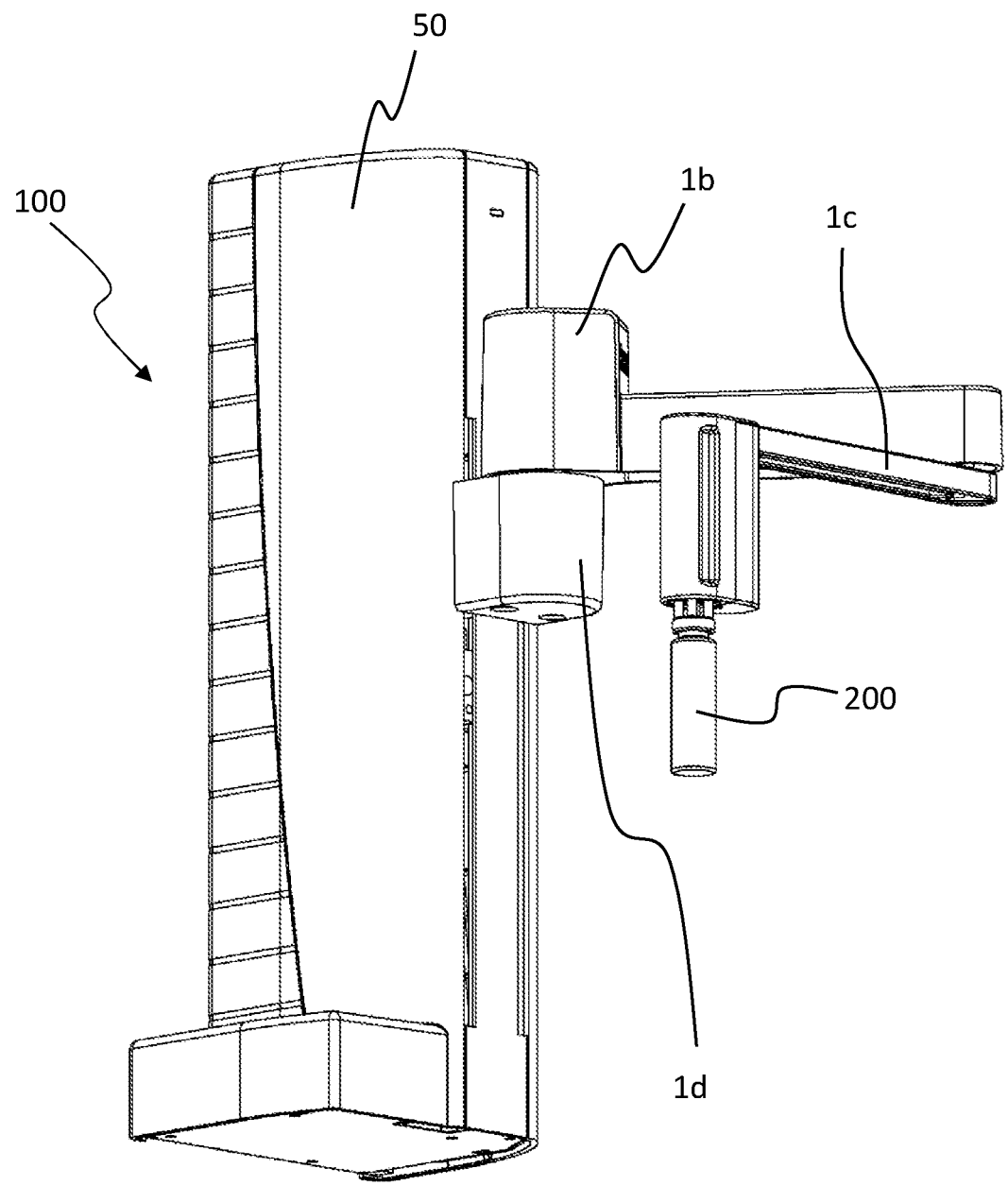
FIG. 7 is a perspective view of the arm of FIG. 1, coupled with a device for moving an apparatus according to a possible embodiment of the present invention.
Figure 7A:
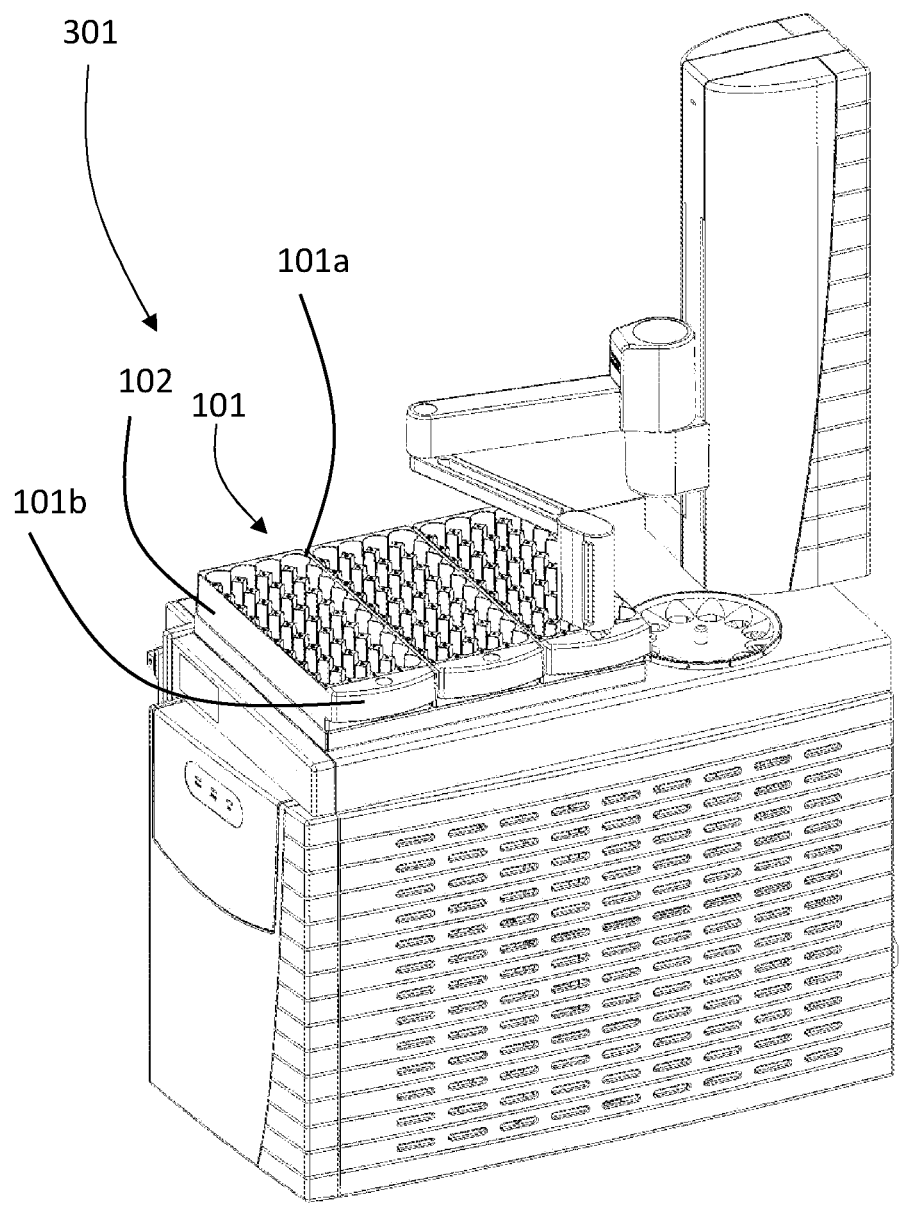
FIG. 7A is a perspective view of the arm of FIG. 7, arranged at a stock of vials of an apparatus according to an embodiment of the present invention.
Figure 8:
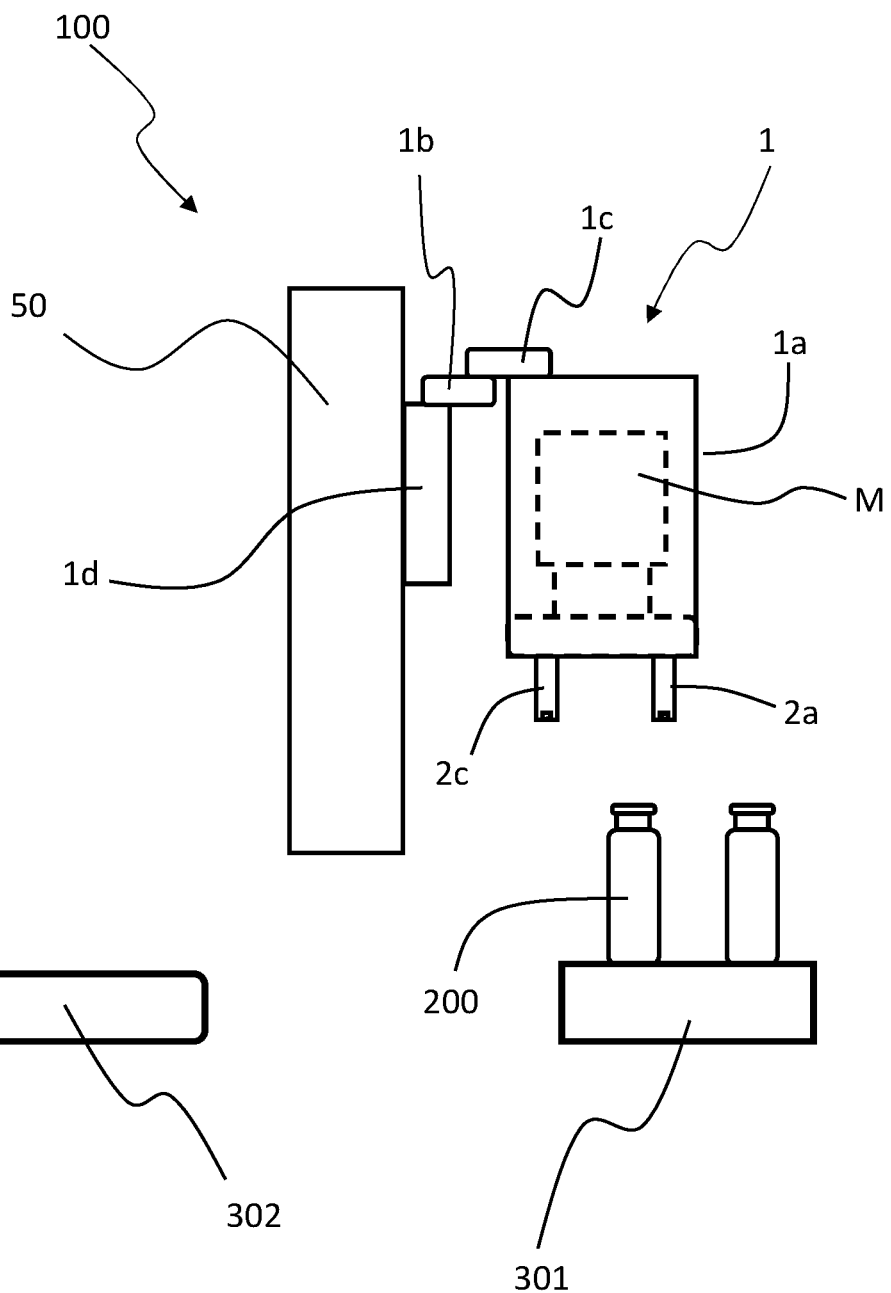
FIGS. 8-14 are schematic serial views of the steps for displacing a vial by means of an apparatus according to an embodiment of the present invention.

The mobile arm 1 is mounted in a known way on a movement device 50 shown in detail in FIG. 7 and schematically in FIGS. 8-14, known in the art and thus not discussed in detail. The movement device 50 is adapted to move, translate and/or rotate the mobile arm 1, so that to bring it alternately at least at the first station 301 and at the second station 302. Typically, the movement device 50 has an electric motor and a control unit which are adapted to drive the movement of the mobile arm 1. In alternative embodiments, the motor and/or control unit could be arranged on the mobile arm 1. In other words, the mobile arm 1 could be coupled to the movement device so that the movement of the mobile arm 1 is driven by the arm itself.

Figure 2:
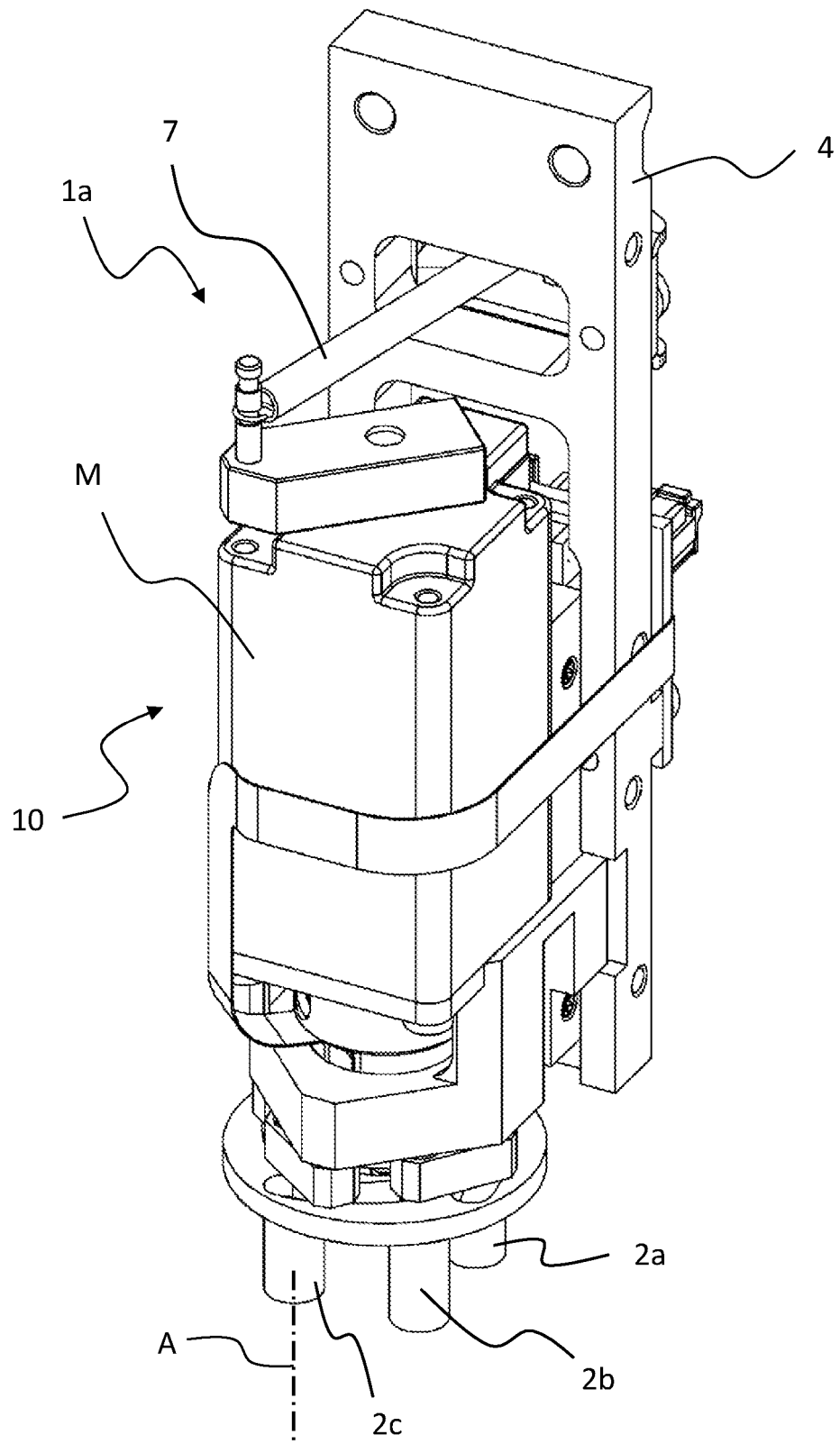
FIG. 2 is a perspective view of the elements of FIG. 1, in assembled form.
Figure 5:
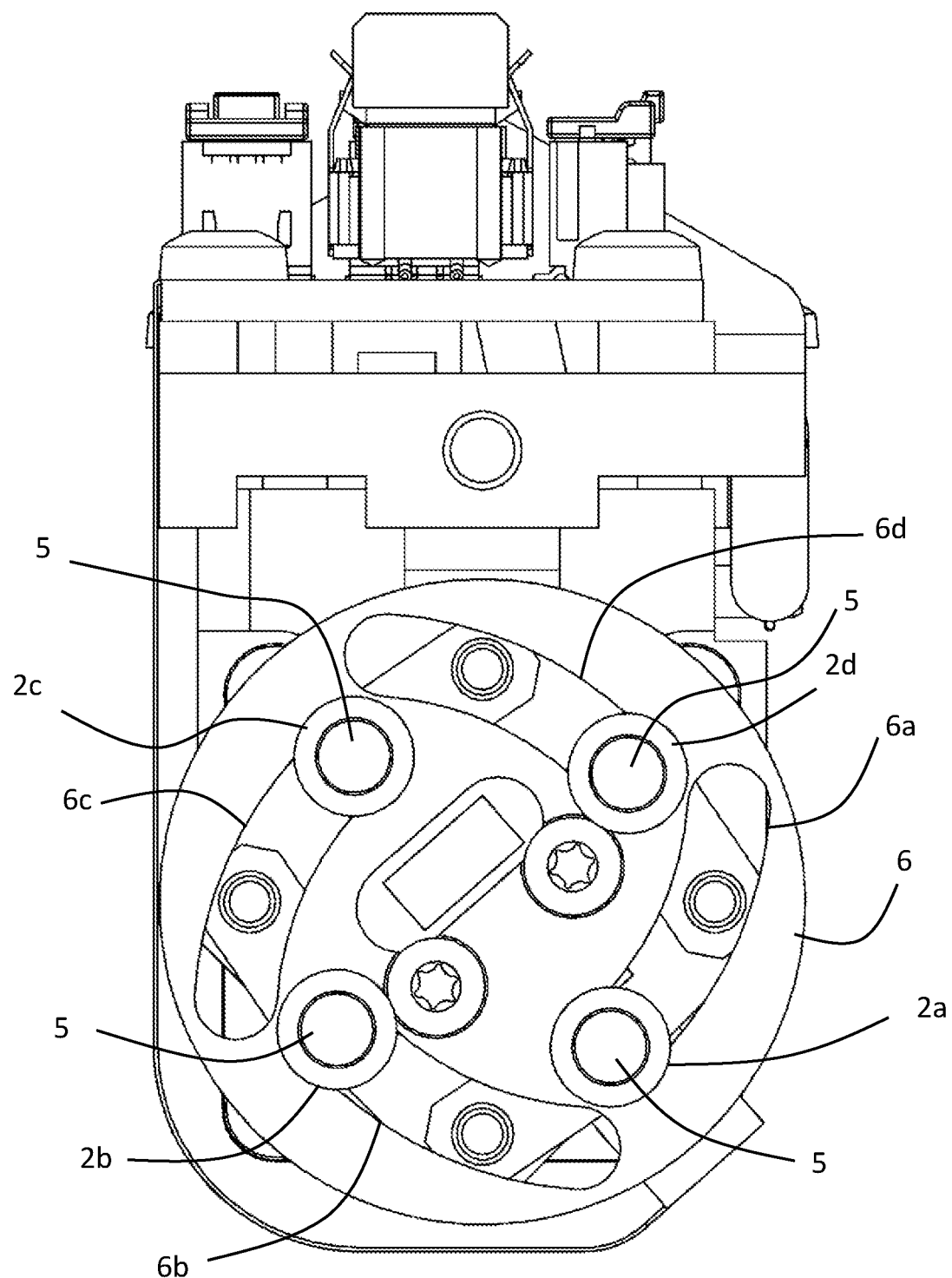
FIG. 5 is a plan view from the bottom of the arm of FIG. 2.

Typically, the mobile arm 1 has an end portion 1a shown in detail in FIGS. 1, 2 and 5, and connecting elements 1b, 1c, 1d shown in FIG. 7 and also schematically in FIGS. 8-14, which are adapted to allow a movement of the end portion 1a with respect to the movement device 50. For example, in the embodiment shown, two elements 1b, 1c hinged in series to one another are shown. The first element 1b is hinged to a cursor 1d, translatably constrained with respect to the movement element 50. The embodiment shown is only exemplary, since the arm 1 and/or the movement device 50 can be provided with different elements, in number and/or type, that allow to move the end portion 1a with respect to the movement device 50. In general, the mobile arm 1 is preferably constrained to the movement device 50 so that to be able to at least translate along a vertical direction, and to rotate around an axis in turn vertical. The "vertical" direction is considered in a use condition of the apparatus 100.

The mobile arm 1, hereinafter also "arm 1," typically has a body 10, on which the gripping elements 2a-2d are mounted. In the embodiment shown, the body 10 comprises an electric motor M adapted to indirectly move, as better discussed below, the gripping elements 2a-2d, by means of an actuating pin 3.

The body 10 is directly or, more preferably, indirectly constrained to the movement device 50. In the embodiment shown, the body 10 is constrained to a plate 4 in turn constrained, in a known way and not shown in detail, to the movement device 50.

According to a possible embodiment, a limited translation between the body 10 and the plate 4 is possible. Such translation occurs in a longitudinal direction, i.e. parallel to the plate and to the axis A of the gripping elements 2a-2d, as better discussed below. Typically, such translation occurs when the arm 1 meets the vial 200, or another obstacle, in its vertical movement. The apparatus 100 can thus detect a relative translation between the body 10 and plate 4, by means of special sensors, for example an optical sensor mounted on the plate 4 that is blocked out by the movement of the body 10, or which are configured to assess the extension or the compression of a spring 8 interposed between the body 10 and the plate 4. Since such movement is caused by an obstacle met by the arm 1, the apparatus 100 is typically configured so that to stop the movement of the arm 1 when a translation between body 10 and plate 4 is detected.

As mentioned, the arm 1 has at least two gripping elements 2a, 2b, 2c, 2d movable between one another. The gripping elements 2a-2d are typically constrained, at an end thereof, to the body 10, so that to protrude therefrom. According to a possible aspect, at least part of the gripping elements 2a-2d is of the same length. Preferably, all the gripping elements 2a-2d are of equal length.

An embodiment can for example provide two gripping elements shaped like pincers, or in a similar way. However, the gripping elements 2a-2d preferably have a substantially rectilinear longitudinal axis A, like in the embodiment shown. In particular, according to a preferred aspect, the gripping elements 2a-2d have a substantially prismatic or cylindrical shape. It is thus preferable to provide the arm 1 with at least three gripping elements 2a-2d in order to ensure a good coupling between them and the vial 200. According to an embodiment, shown in the figures, the arm 1 has four gripping elements 2a-2d.

At least part of the gripping elements 2a-2d has a magnet 5, at a free end thereof, opposite the one constrained to the body 10. The magnet 5 is preferably a permanent magnet, even if the possibility to provide the gripping elements with electromagnets is not excluded. Preferably, all the gripping elements 2a-2d have a magnet 5. It is possible to adjust the magnetic force of the magnets 5 by orienting their magnetic field appropriately. In particular, the maximum magnetic force is achievable by orienting the magnets in an alternated way, i.e. with the poles reversed to one another. For example, in a possible embodiment, a first gripping element has a magnet with magnetic north facing the container 200, whereas the magnet of a different gripping element has magnetic south facing the vial 200.

Figure 6A:
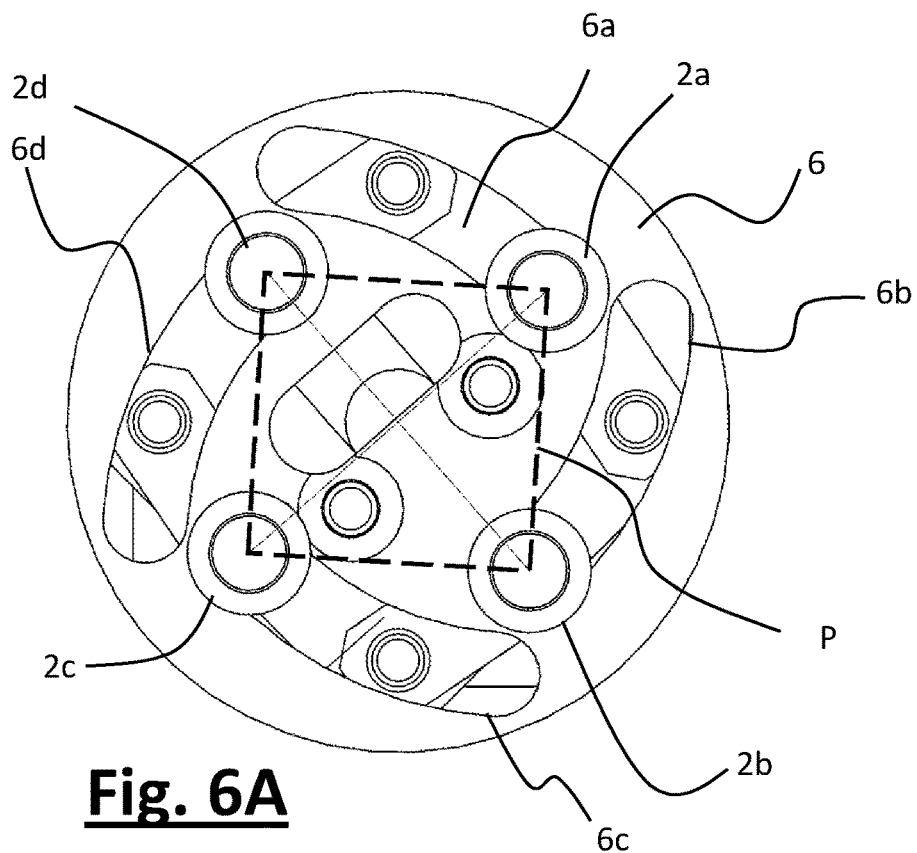
FIG. 6A is a simplified plan view from the bottom of the cam of the arm of FIG. 5, with the gripping elements arranged in a first position, in which the distance between the gripping elements is minimal.
Figure 6B:
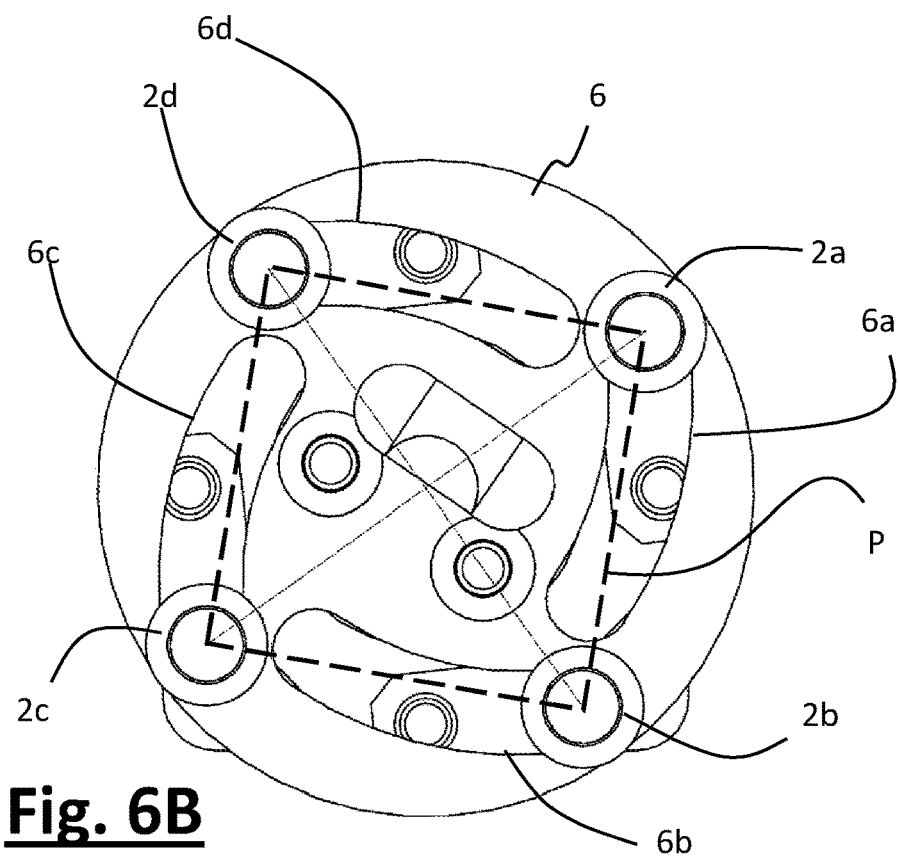
FIG. 6B is a simplified plan view from the bottom of the cam of the arm of FIG. 5, with the gripping elements in a second position, in which the distance between the gripping elements is maximal.

The gripping elements 2a-2d are movable between one another, so that to vary the area of the polygon P shown in FIGS. 6A and 6B and having as vertexes the ends of the elements themselves. The polygon P is traced by joining the geometric centroid of the free ends of the gripping elements 2a-2d. The polygon P is traced so that to prevent intersections between the sides of the polygon P.

The gripping elements 2a-2d are thus movable between at least one first position, shown in FIG. 6A, and a second position, shown in FIG. 6B. The second position thus coincides with the maximum area of the polygon P, whereas the first position P coincides with the minimum area of the polygon P.

Thus, the area of the polygon P in the first position of the gripping elements 2a-2d is smaller than the area of the polygon P that forms when the gripping elements 2a-2d are in the second position. Various methods, known in the art, can be used to move the gripping elements 2a-2d. According to the invention, a possible system for moving the gripping elements 2a-2d provides a cam 6 adapted to move the gripping elements 2a-2d.

In particular, according to a preferred aspect, the cam 6 is a cylindrical element rotatably mounted on the body 10, and has slots 6a-6d, which are crossed by the various gripping elements 2a-2d. The slots 6a-6d have a substantially circular shape, i.e. are shaped like an arc of circle. Nonetheless, the slots 6a-6d are not concentric to one another. This way, when the cam 6 is rotated from the first to the second position, or vice-versa, the gripping elements 2a-2d are displaced between opposite ends of the respective slot 6a-6d. Since the slots 6a-6d are not concentric, the distance between the various gripping elements 2a-2d is changed when the gripping elements 2a-2d are displaced along the slots 6a-6d. In other words, when the cam 6 is rotated, the area of the polygon P having vertexes at the gripping elements 2a-2d is changed, so that to define the first and second positions discussed above.

Typically, in the second position the gripping elements 2a-2d are into contact with the respective end of the slot 6a-6d, which thus determine a limit stop of the gripping elements 2a-2d with respect to the cam 6. In the first position, the gripping elements 2a-2d come closer to the respective end of the slot 6a-6d without however reaching it, since, in this case, the limit stop of the gripping elements 2a-2d is determined by their contact with the vial 200, typically with the cap 201 thereof.

In the first and/or in the second position, the polygon P preferably has sides of length substantially equal to one another or anyhow with negligible differences in length, for example of less than 15%.

In general, when the arm 1 has to collect a big vial 200, the gripping elements 2a-2d are positioned so that the magnets 5 are arranged at one or more of the ferromagnetic elements 205 of the vial 200. For example, if the ferromagnetic elements 205 takes up a large surface on the vial 200, the gripping elements 2a-2d can be arranged both in the first position and in the second position, since the magnets 5 can be arranged at the ferromagnetic elements 205 in both cases. If the ferromagnetic elements 205 instead have a particular arrangement, the gripping elements 2a-2d are arranged in the position that ensures a better coupling between the vial 200 and the gripping elements 2a-2d.

Thus, in general, the gripping elements 2a-2d are arranged in the position that ensures greater cooperation between the magnets 5 of the gripping elements 2a-2d and the ferromagnetic element, or ferromagnetic elements 205, of the vial 200.

If the vial 200 has little dimension and is typically devoid of ferromagnetic elements, the gripping elements 2a-2d are initially arranged in the second position, so that to be able to be arranged around the vial 200. Successively, the gripping elements 2a-2d are brought to the first position, so that to tighten and come into contact with the vial 200, grabbing it.

According to an aspect of the invention, in the second position, the polygon P traced with vertexes at the ends of the gripping elements 2a-2d has an area between 100 and 400 mm$^2$, more preferably between 130 and 350 mm$^2$.

The area of the polygon P in the first position is instead preferably between 0.2 and 0.7 times the area of the polygon in the second position.

As discussed above, in the preferred embodiment of the present invention, the apparatus 100 has four gripping elements 2a-2d. In such embodiments, the area of the polygon P, in the second position, is preferably between 170 and 250 mm$^2$.

According to a possible aspect, at least one between the first and the second position, preferably at least the first, is stable. In preferred embodiments, such as the one shown in the figures, both positions are stable.

The apparatus 100 preferably has mechanical elements 7 to stably hold the gripping elements 2a-2d alternately in the first and in the second position. With particular reference to the embodiment shown, such mechanical elements 7 are configured so that to hold the cam 6 alternately in the positions determining the first and the second position of the gripping elements 2a-2d.

In the embodiment shown, the mechanical elements comprise a spring 7 acting on the cam 6. The spring 7 is arranged so that, when the gripping elements 2a-2d are in the first position or in the second position, the spring 7 hinders their displacement away from the position itself. In other words, the resistance of the spring 7 must be overcome in order to move the gripping elements 2a-2d from the first to the second position. In the same way, the resistance of the spring 7 must be overcome in order to move the gripping elements 2a-2d from the second to the first position. Thanks to this, the first and the second positions of the gripping elements 2a-2d are thus stable positions.

Figure 2A:
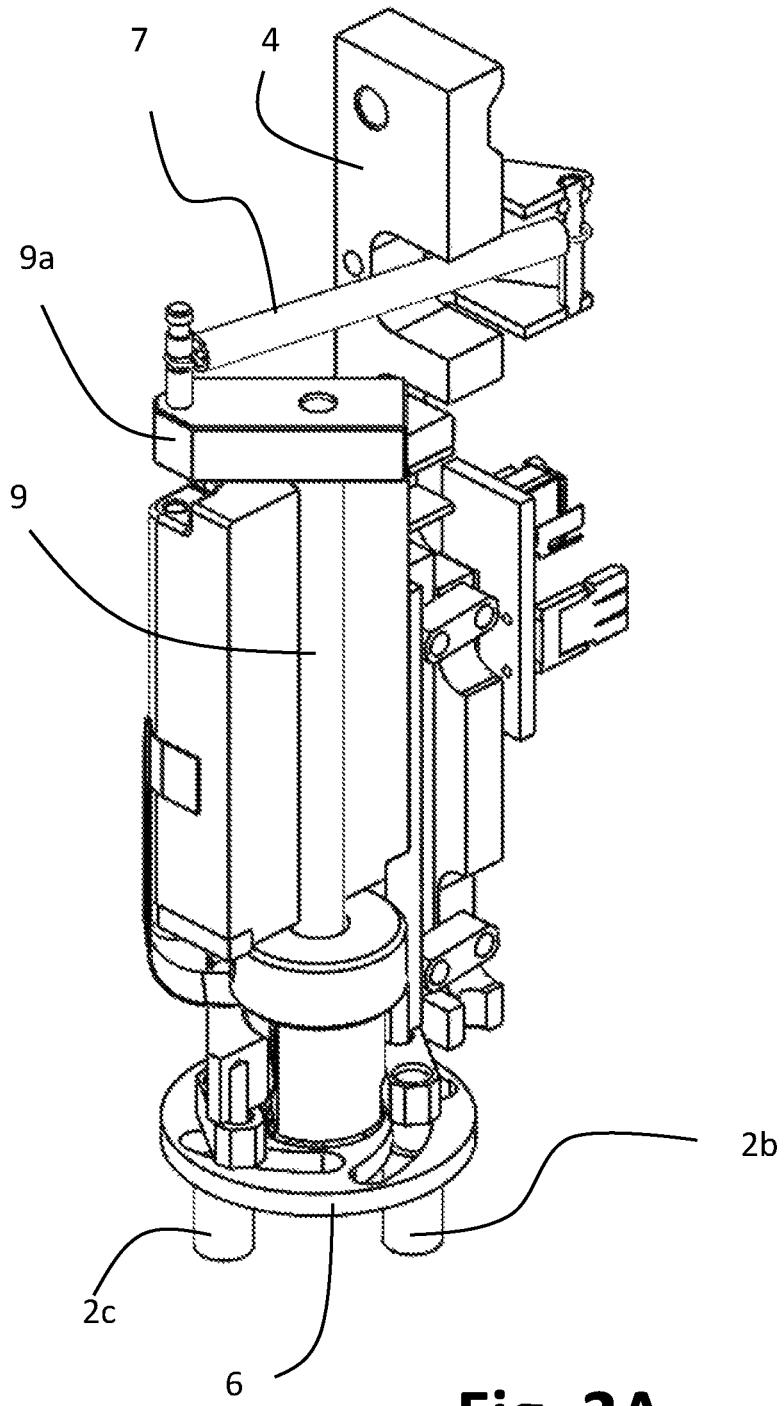
FIG. 2A is a partial sectional view of that which is shown in FIG. 2.

In particular, according to possible solutions, such as the one shown in FIG. 2A, the cam 6 is constrained to a shaft 9 typically moved by the respective motor M. The shaft 9 can be a shaft constrained to the actuating pin 3 or, like in the figures shown, the shaft 9 can coincide with the actuating pin 3.

A further rotatable element 9a is constrained to the shaft 9, so that the rotation of the shaft 9 causes the rotation of both the cam 6 and the rotatable element 9a. The spring 7 is constrained to the rotatable element 9a, so that the rotation of the rotatable element 9a deforms the spring 7. The spring 7 is thus constrained to the rotatable element 9a spaced from the shaft 9, so that the rotation of the rotatable element causes a translation of the end of the spring 7, or anyhow of the point of the spring 7 constrained to the rotatable element 9a.

Thus, in general, the spring 7 is positioned so that, when the gripping elements 2a-2d are in the first or in the second position, a rotation of the shaft 9 causes a movement of the rotatable element 9a and a deformation of the spring 7 that opposes to such movement. For example, at the first and second position of the gripping elements 2a-2d, the spring 7 can be substantially at rest, or preloaded in an elongated state. In such case, a rotation of the shaft 9 causes a rotation of the rotatable element 9a such as to cause a possible additional extension of the spring 7. Since the spring 7 was in a condition of equilibrium, or preloaded in an elongated state, the spring 7 opposes to such elongation and exerts a force on the rotatable element 9a which, in the absence of other forces acting thereon, would tend to bring back the rotatable element 9a to the initial condition, i.e. would tend to rotate the shaft 9 so that to bring back the gripping elements 2a-2d to the starting position, i.e. the first or second position depending on the situation.

This allows to implement embodiments wherein the spring 7 defines stable positions (the said first and second position) for the gripping elements 2a-2d. In fact, if the gripping elements are in such position, a rotation of the shaft 9 causes a deformation of the spring 7, which thus opposes to such movement.

Similarly, in alternative embodiments, a spring 7 could be arranged so that, at the first and second position of the gripping elements 2a-2d, the spring 7 is in a condition of equilibrium or compression loaded, and that a movement of the shaft 9 away from the first or second position of the gripping elements 2a-2d causes a, possible further, compression of the spring 7.

The spring 7 is only one of the possible mechanical elements used for the object described above. In general, the mechanical elements 7 are configured to counter the movement of the gripping elements 2a-2d away from both the first and the second position.

Typically, as previously discussed, the arm 1 has a motor M adapted to allow the movement of the gripping elements 2a-2d. The motor M is thus able to overcome the resistance provided by the mechanical elements 7 so that to allow the movement of the gripping elements 2a-2d between the first and the second position. The motor M is thus operated to move the gripping elements 2a-2d towards the first or the second position, but is not operated to hold them in such positions. In other words, the mobile arm 1 is configured so that, thanks to the presence of the mechanical elements 7, the gripping elements 2a-2d can stably be held in the first position, or in the second position, without having to operate the motor M. This clearly involves advantages, since it reduces the energy consumption of the apparatus 100, and avoids overheating the motor M and especially, in case of power supply interruptions to the apparatus, the gripping elements 2a-2d are held in the first or in the second position. Thus, also in case of electrical fault, a vial 200 possibly constrained to the gripping elements 2a-2d is not disengaged therefrom.

One or more sensors S can be present on the apparatus 100. A first sensor S can for example be provided for checking the presence of a vial 200 constrained to the gripping elements 2a-2d. The same sensor S can also be used for checking the presence of a vial at the first or the second station. As an alternative, two distinct sensors can be used to perform the functions discussed above.

Such sensors can for example be proximity sensors. They are optical sensors in the embodiment shown in the figures.

Figure 3:
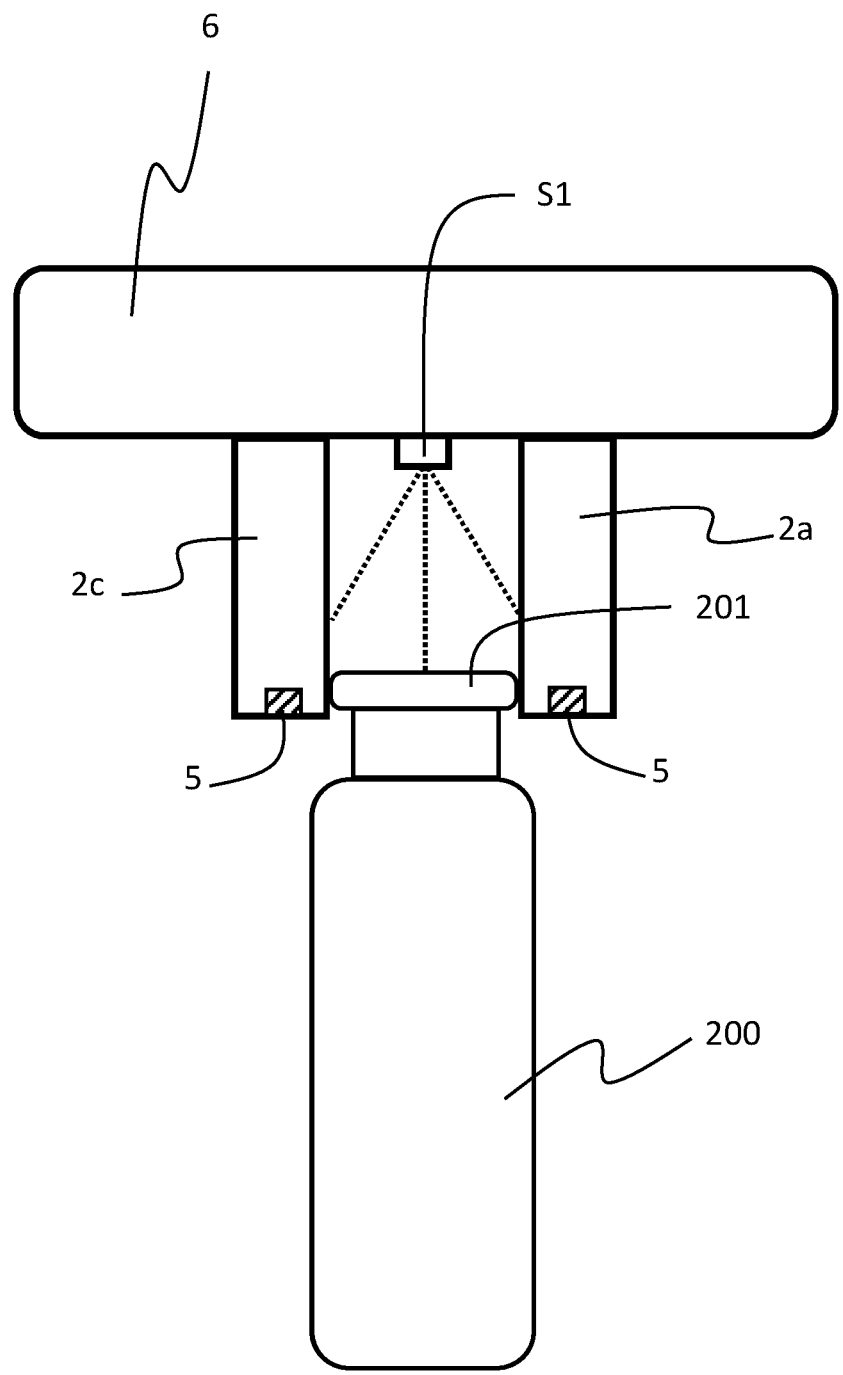
FIG. 3 is a schematic view showing the coupling between an arm of an apparatus according to the present invention and a small vial.

The sensor S can also be used for checking the position of the gripping elements 2a-2d. For example, in case of an optical sensor, the sensor S can detect when the gripping elements go inside a cone drawn with vertexes placed at the sensor itself, cone which defines the detecting area of the sensor itself, as schematically shown in FIG. 3. As an alternative, an appropriate sensor can be dedicated for such purpose. Similarly, the same sensor S, or a further sensor, can be used for determining the type of vial present in the first station 301, or anyhow the type of vial that the mobile arm 1 must move.

According to a preferred embodiment, the sensor S is a sensor able to detect or estimate at least one dimension of a portion 101b of the stock 101, typically a portion 101b of the respective tray.

For example, the sensor S previously described can detect the contact with the portion 101b during the descent of the arm 1, so that to determine, or anyhow estimate, the height of the respective portion 101b.

According to a possible embodiment, each type of stock 101, typically each tray 102, has a portion 101b positioned at a different height with respect to the other stocks. This way, thanks to the sensor S, it is possible to recognize the type of tray, or anyhow of stock 101, present at the first station 301.

According to an aspect, each tray 102 can accommodate a single type of vial. Thus, by detecting the type of tray or stock, the apparatus 100 recognizes which type of vial 200 it must move. Embodiments are anyhow wherein each tray 102 can accommodate a different number, typically limited, of vials 200. In such case, the recognition of the type of vial 200 can provide a further step of assessing the height of the vial 200, i.e. of assessing to which extent the vial 200 protrudes from the respective housing 101a. Again, such operation can be carried out for example by means of the sensor S, by assessing at which point of a new descent of the mobile arm 1, which was typically at least partially raised after having met the portion 101b of the stock 101, it meets the respective vial 200.

With reference to FIGS. 8-14, the arm 1 is initially moved at a vial 200 arranged at the first station 301. Depending on the type of vial 200, which can for example be detected by one of the sensors of the apparatus 100 or communicated by a user to the apparatus 100, the gripping elements 2a-2d are arranged in the required position.

For example, in a possible embodiment, a mobile arm 1 can operate with vials 200 of a capacity of 2 ml, 10 ml and 20 ml. The vials have different sizes, among which different heights, for example respectively 33 mm, 48 mm and 78 mm.

The 2 ml vials are mechanically grabbed by the arm 1, whereas the 10 ml and 20 ml vials are magnetically raised by the arm 1.

The apparatus 100 operates with two types of trays 102. A first tray only accommodates 2 ml vials, whereas the second tray can accommodate both 10 ml and 20 ml vials. The two trays have portions 101b arranged at different heights.

In a first step, the mobile arm 1 is thus lowered to detect the height of the portion 101b, so that to distinguish the type of tray 102 present in the first station 301.

Whenever the first tray is detected, i.e. the tray for 2 ml vials, the gripping elements 2a-2d are operated so that to mechanically grab the vial 200.

Whenever the second tray is detected, i.e. the tray for 10 or 20 ml vials, the gripping elements can be arranged in the best position for magnetically raising the vial. Such best position can be different depending on the type of vial, i.e. the position for the 10 ml vial can be different than the position for the 20 ml vial. Thus, it is necessary to detect which vial is accommodated in the respective tray.

Such operation is carried out by means of the sensor S, by detecting the height of the vial itself. In particular, after the contact with the tray, the arm, typically after having been raised again, is brought at the vial 200 and lowered towards it, until a contact between the vial 200 and the arm 1 occurs. Such contact is detected by the sensor S, so that the apparatus 100 is able to estimate the height, and consequently the type, of the vial 200.

As discussed, the detection of the height of the portion 101*b* and the vials 200 is preferably carried out by detecting the contact of the gripping elements 2*a*-2*d* with such elements.

The contact with a surface determines the vertical displacement of the gripping elements 2*a*-2*d* with respect to the body 10, which can be detected by a respective sensor S, for example an optical sensor.

It should be noted that since the sizes of the vials were only reported in an exemplary form, different types and sizes of vials can thus be handled by the present apparatus 100.

It should be noted that, in alternative embodiments, an operator can provide the information related to the type of vial 200 to be handled to the apparatus 100.

In general, the behavior of the arm 1 changes depending on the type of vial 200.

Figure 9:
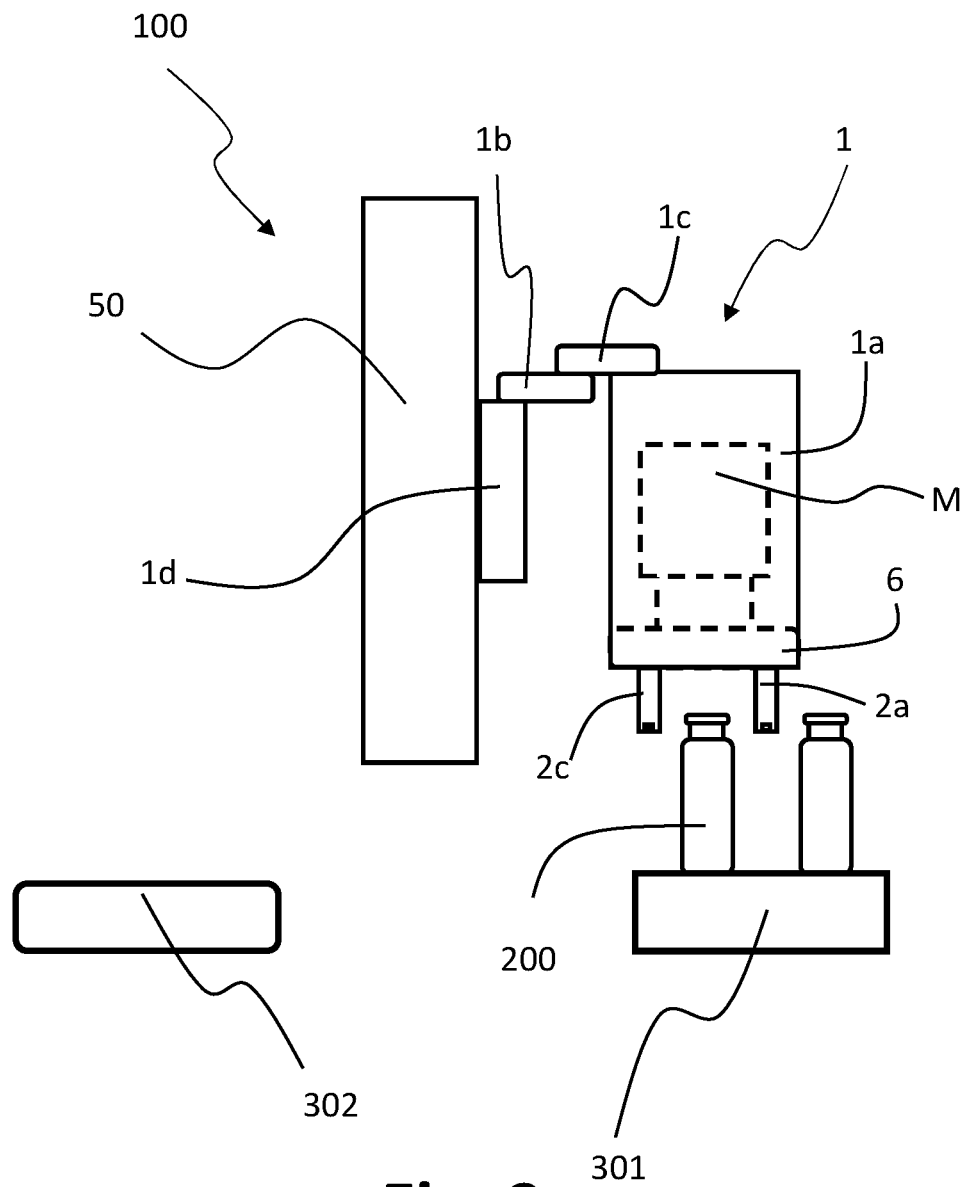
Figure 10:
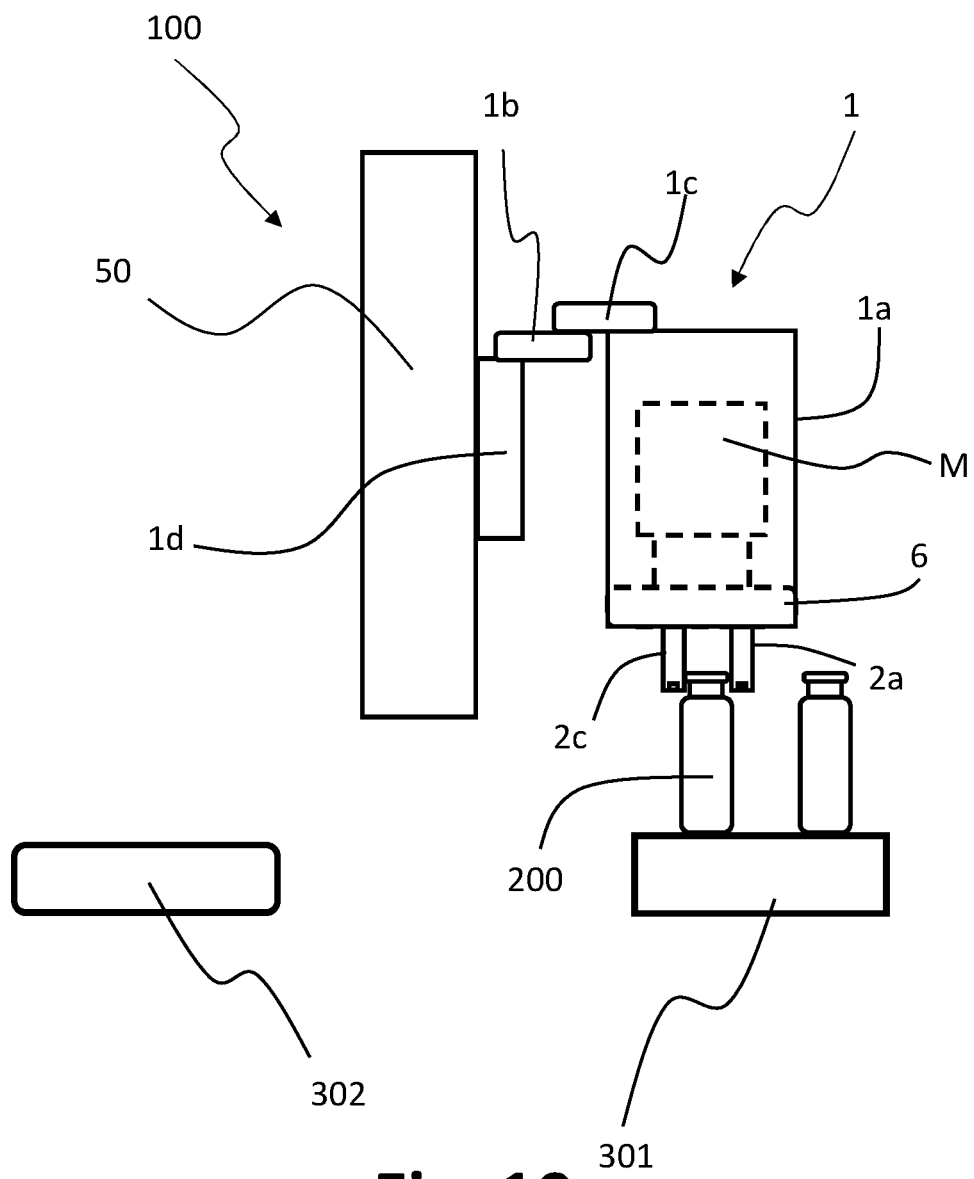
Figure 11:
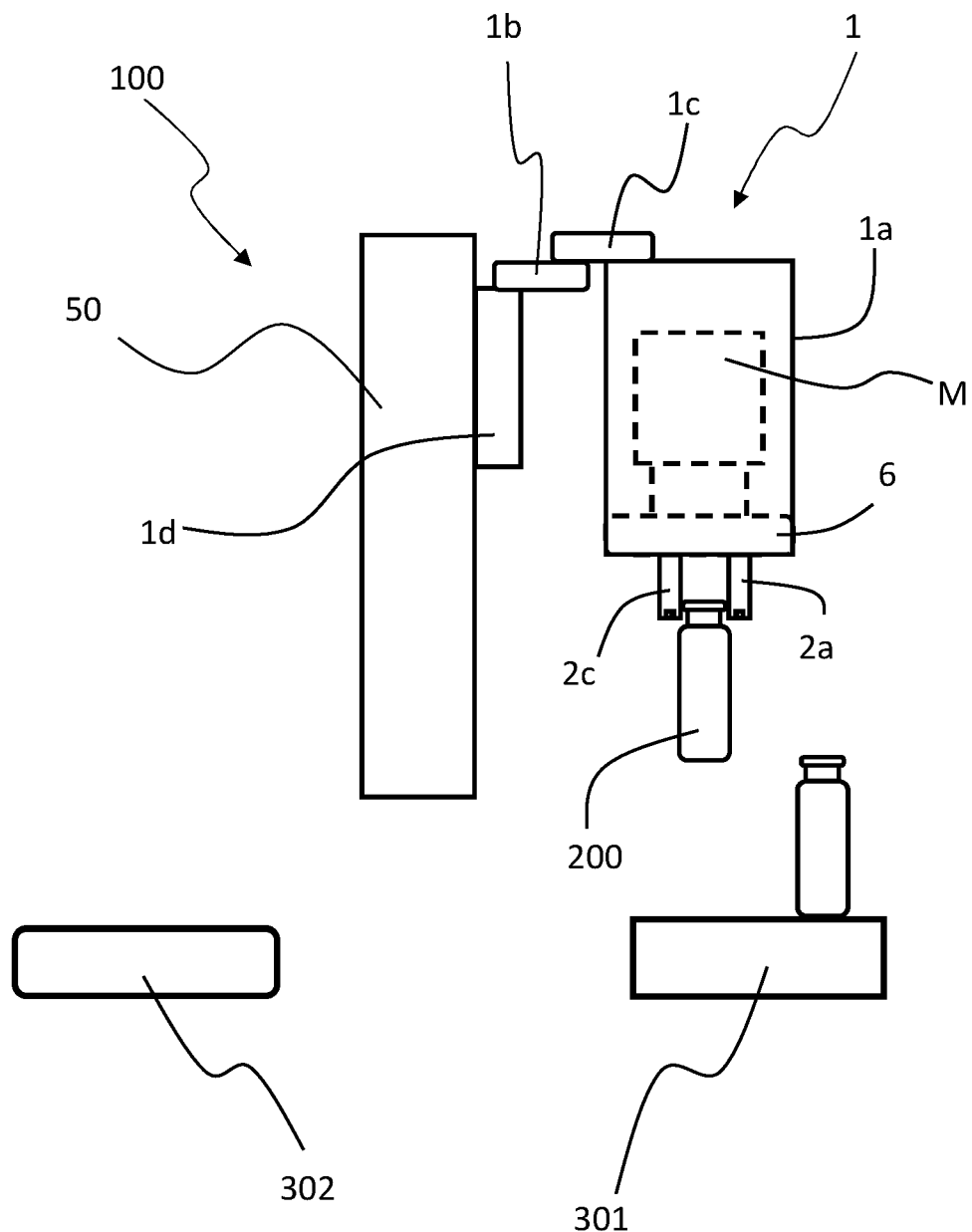
Figure 12:
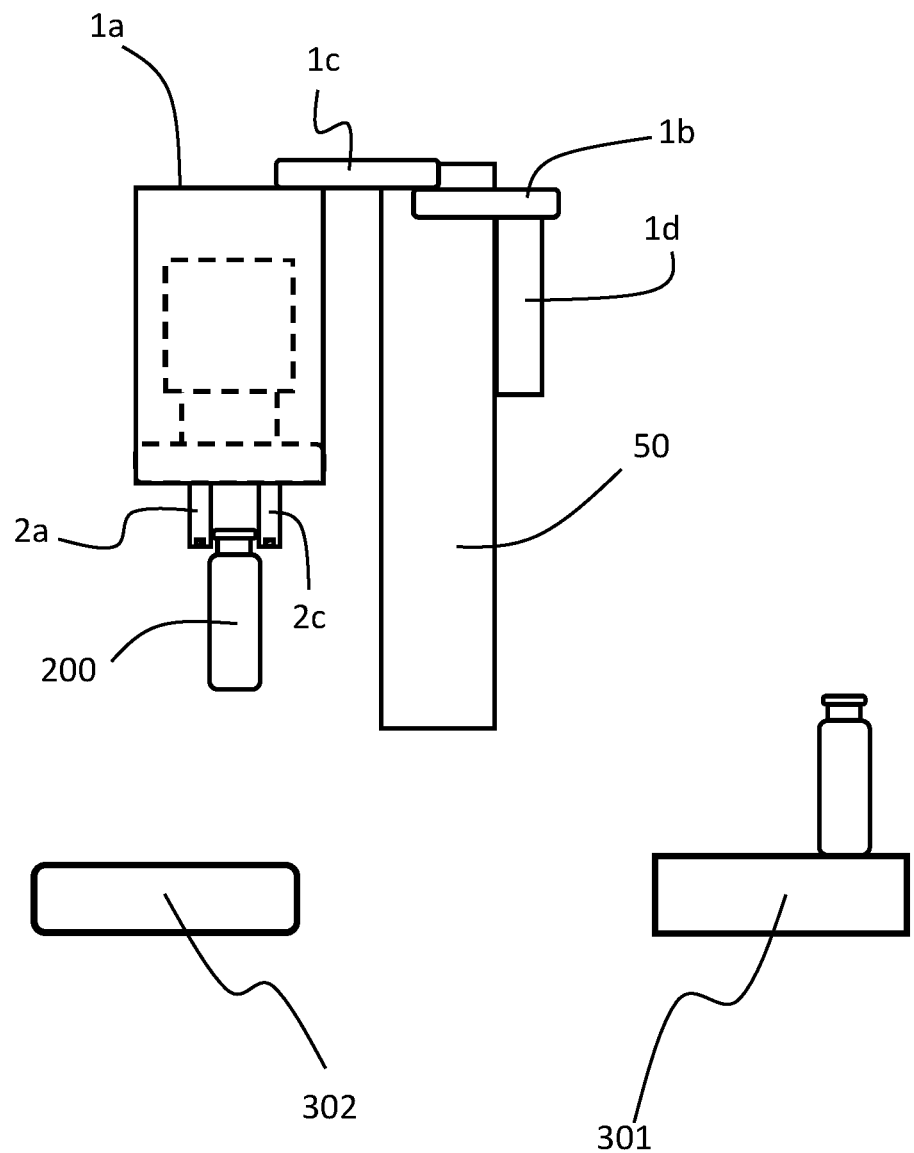
Figure 13:
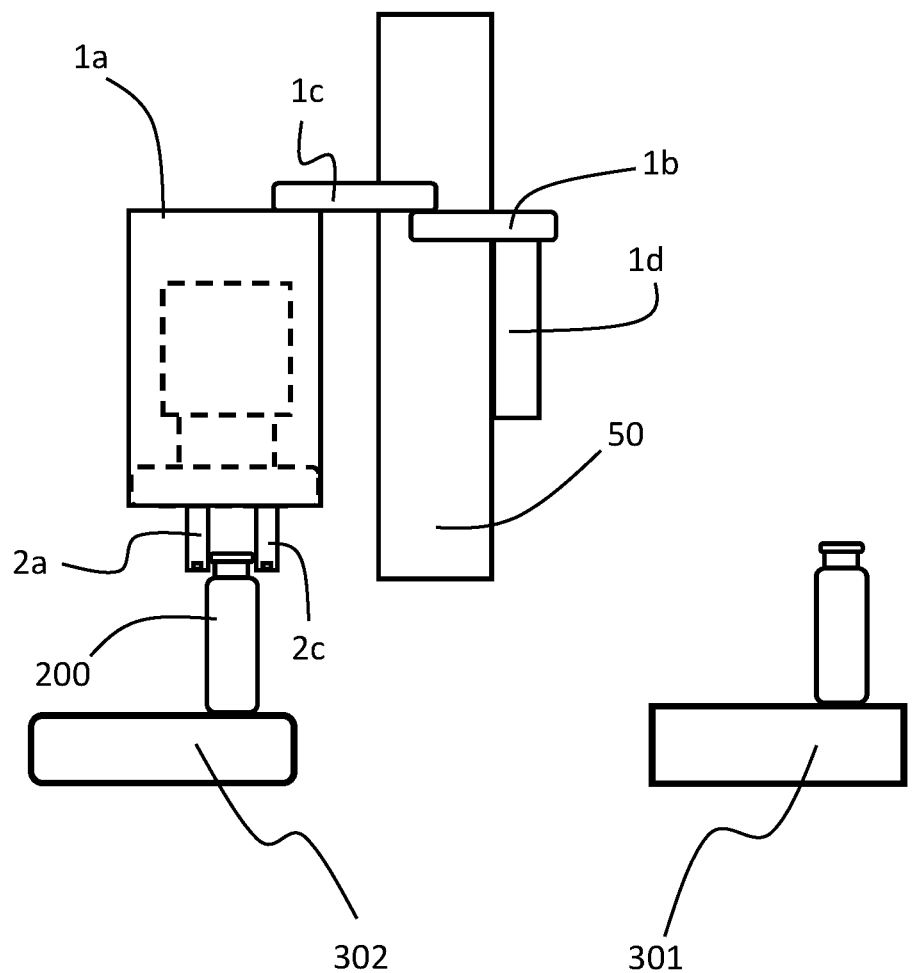
Figure 14:
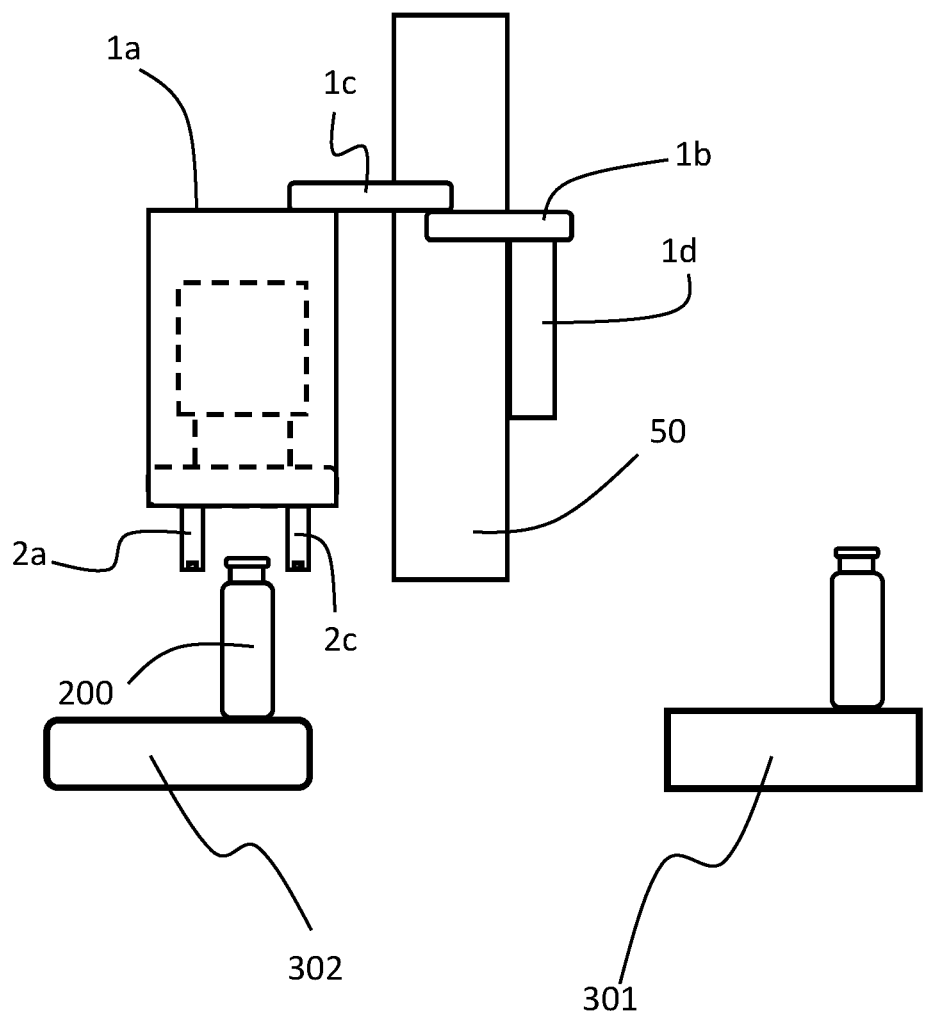

For example, in the case shown in FIGS. 8-14, the vial 200 is small. The arm 1 is thus brought close to the vial 200 and the gripping elements 2*a*-2*d* are arranged in the second position. When the gripping elements 2*a*-2*d* are arranged around the vial 200, as shown in FIGS. 9 and 10, it is possible to move them to the first position, so that to grab the vial 200, typically by tightening the cap 201 thereof.

Preferably, during such step, the motor M operates so that to overcome the resistance of the mechanical means 7, thus bringing the gripping elements 2*a*-2*d* from the second to the first position. Then, since the mechanical elements 7 are sufficient to hold the gripping elements 2*a*-2*d* into contact with the vial 200, the motor M is deactivated. In particular, the motor M is preferably operated so that to rotate the cam 6, thus causing the movement of the gripping elements 2*a*-2*d* from the second to the first position along the respective slots 6*a*-6*d*.

Figure 4:
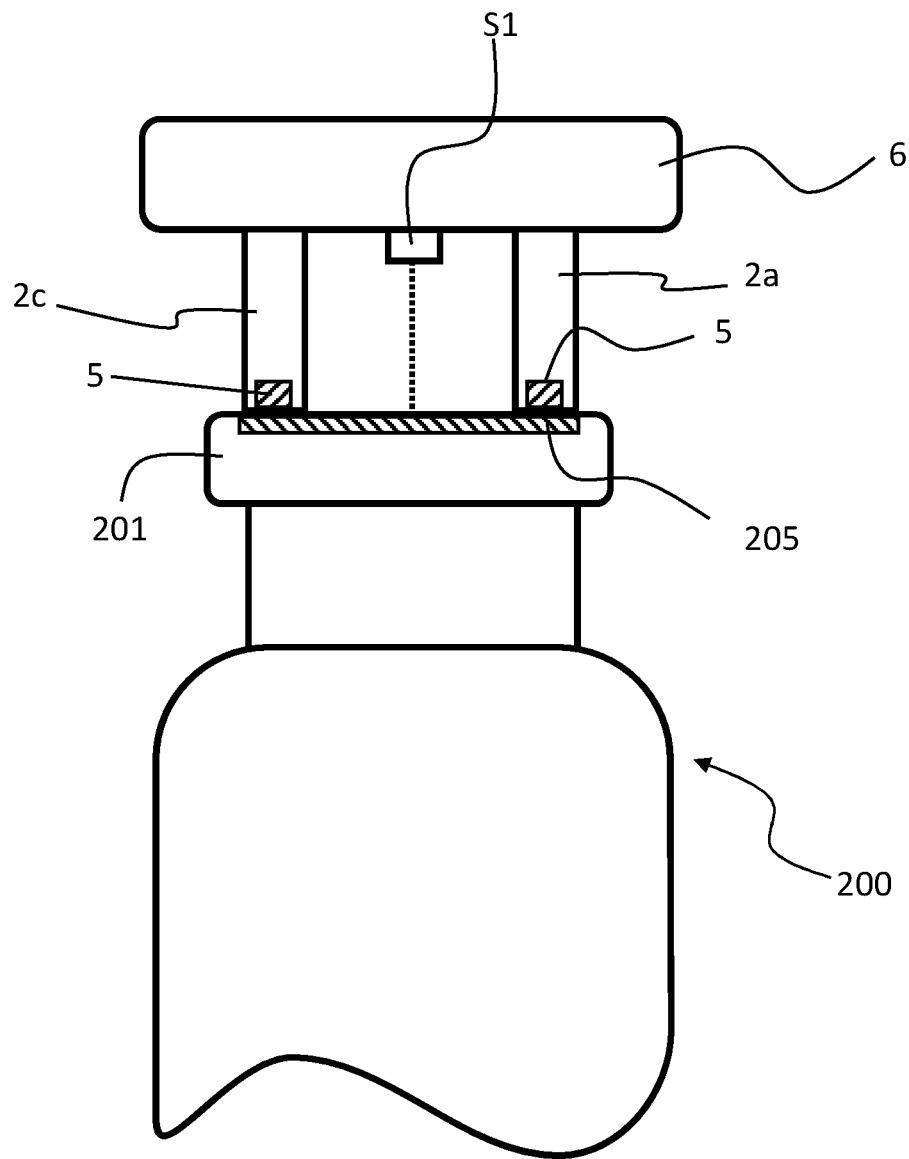
FIG. 4 is a schematic view showing the coupling of the arm of FIG. 3 to a big vial provided with a ferromagnetic element.

Although FIGS. 8-14 show the displacement of a small vial 200, the same apparatus 100 can be used for collecting and displacing a bigger vial, as long as it is provided with a ferromagnetic element 205. In fact, in such case, the gripping elements 2*a*-2*d* of the same arm 1 are arranged in the position that allows a better magnetic coupling between the magnets 5 of the gripping elements 2*a*-2*d* and the ferromagnetic element 205 of the vial 200. When the arm 1 comes closer to the vial 200, the attraction between the magnets 5 and the ferromagnetic element 205 causes the coupling between the vial 200 and the gripping elements 2*a*-2*d*, as shown in FIG. 4 and in FIG. 7.

Once the vial 200 is constrained to the arm 1, by coupling mechanically or magnetically, the arm 1 is moved from the movement device 50 so that the vial 200 is transported from the first station 301 to the second station 302. In general, during this step, the vial 200 is raised from the first station 301, translated and lowered at the second station 302, as schematically shown in FIGS. 11-14.

Then, the vial 200 is disengaged from the gripping elements 2*a*-2*d*. Typically, if the vial 200 is grabbed by the gripping elements 2*a*-2*d*, as schematically shown in FIGS. 8-14, the gripping elements are moved from the first position to the second position, so that to release the vial 200. Preferably, the motor M is operated to carry out such operation.

If the vial 200 is magnetically constrained to the gripping elements 2*a*-2*d*, it is for example possible to insert, at least partially, the vial in a respective seat of the second station 302 and to operate a translation, typically horizontal, of the gripping elements 2*a*-2*d*, so that the vial 200 is held by the second station 302.

The vial 200 is preferably kept in vertical position through all the steps of moving it. Moreover, the apparatus 100 is preferably configured so that to collect a vial 200 arranged in a substantially vertical way from the first station 301, and to release the vial 200 in a substantially vertical condition at the second station 302.

The invention claimed is:

1. Apparatus for transferring a vial from a first station to a second station, comprising a stock of vials in said first station, a mobile arm provided with at least three gripping elements movable between one another in a controlled way at least between a first and a second position, wherein the free ends of at least part of said gripping elements have a magnet, and wherein an area of a first polygon having as vertexes said free ends in said first position is smaller than an area of a second polygon having as vertexes said free ends in said second position wherein said gripping elements are constrained to a cam adapted to move said gripping elements, wherein said cam is preferably rotatable and is provided with a slot (6*a*-6*d*) for each gripping element, so that the rotation of the cam causes a movement of the gripping elements along said slots.

2. Apparatus according to claim 1, wherein said mobile arm has a motor for moving, directly or indirectly, the gripping elements.

3. Apparatus according to claim 1, wherein the gripping elements have a substantially rectilinear longitudinal axis, and wherein said gripping elements preferably have a substantially prismatic or cylindrical shape.

4. Apparatus according to claim 1, wherein said first and second positions of the gripping elements are stable positions.

5. Apparatus according to claim 4, comprising mechanical elements configured to stably hold said gripping elements alternatively in said first or second position.

6. Apparatus according to claim 1, when dependent from claim 5, wherein said mechanical elements comprise a spring configured so that the rotation of said cam causes a deformation of said spring, and so that a rotation of said cam away from said first or from said second position of said gripping elements is hindered by the resistance provided by the deformation of said spring.

7. Apparatus according to claim 6, wherein said cam is constrained to a rotatable shaft, a rotatable element being constrained to said rotatable shaft, said spring being constrained to said rotatable shaft, so that the rotation of said rotatable shaft, away from said first or second position of said gripping elements, causes the movement of said rotatable element, said movement of said rotatable element being hindered by the resistance provided by said spring.

8. Apparatus according to claim 1, wherein said stock comprises at least one tray provided with a plurality of housings for said vials.

9. Apparatus according to claim 1, comprising at least one sensor selected among:
   a. a sensor for checking the presence of a vial in said first station;

b. a sensor for checking the presence of a vial constrained to said gripping elements;
c. a sensor for checking the position of the gripping elements;
d. a sensor for determining the type of vial to be moved.

10. Apparatus according to claim 1 wherein, in said first and second positions, the polygon having as vertexes said free ends of the gripping elements has sides of substantially equal length.

11. Method for moving a vial from a first station to a second station by means of an apparatus according to claim 1, comprising the steps of:
   i. Moving the mobile arm next to a vial in the first station;
   ii. Arranging the gripping elements so that to collect the vial from the first station;
   iii. Moving the vial from the first station to the second station;
   iv. Releasing the vial in the second station;
   wherein, in said step ii, if the vial has dimensions greater than a predetermined value, the gripping elements are magnetically coupled with a corresponding ferromagnetic element of the vial;
   wherein, in said step ii, if the vial has dimensions smaller than a predetermined value, the gripping elements grab the vial.

12. Method according to claim 11, comprising the step of detecting the type of vial to be moved, before said step ii.

13. Method according to claim 12, wherein said detecting step comprises the step of detecting or estimating at least one dimension of a portion of said stock.

* * * * *